US011901924B2

(12) United States Patent
Voor et al.

(10) Patent No.: US 11,901,924 B2
(45) Date of Patent: Feb. 13, 2024

(54) POWER VARIATION CORRECTION FOR A TRANSMITTER

(71) Applicant: Silicon Laboratories Inc., Austin, TX (US)

(72) Inventors: Thomas Edward Voor, Cedar Park, TX (US); Hendricus De Ruijter, San Jose, CA (US); Richard Hendricks, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 17/897,706

(22) Filed: Aug. 29, 2022

(65) Prior Publication Data

US 2023/0421183 A1 Dec. 28, 2023

Related U.S. Application Data

(63) Continuation-in-part of application No. 17/851,534, filed on Jun. 28, 2022.

(51) Int. Cl.
*H04B 1/04* (2006.01)

(52) U.S. Cl.
CPC ....... *H04B 1/04* (2013.01); *H04B 2001/0408* (2013.01)

(58) Field of Classification Search
CPC ... H04B 1/04; H04B 1/16; H04B 1/18; H04B 7/00; H04B 17/13; H04B 2001/0408; H04J 11/00; H04W 52/02; H04W 52/08; H04W 52/20; H04W 52/36; H04W 52/52; H04W 64/00

USPC ......... 370/208, 389, 503; 375/219, 295–297, 375/355

See application file for complete search history.

(56) References Cited

U.S. PATENT DOCUMENTS

| 7,151,759 | B1 * | 12/2006 | Ryan | H03G 3/3078 |
| | | | | 370/335 |
| 9,793,871 | B1 * | 10/2017 | Kim | H03F 3/19 |
| 11,337,162 | B1 * | 5/2022 | Cariou | H04W 52/242 |
| 2013/0135043 | A1 | 5/2013 | Hietala et al. | |
| 2016/0277045 | A1 * | 9/2016 | Langer | H03F 1/3258 |
| 2018/0014266 | A1 * | 1/2018 | Chen | H04W 4/80 |

(Continued)

OTHER PUBLICATIONS

Silicon Labs, "MGM12P Wireless Gecko Multi-Protocol Module Data Sheet," Date Unknown, Rev. 1.4, 100 Pages.

(Continued)

*Primary Examiner* — Shawkat M Ali
(74) *Attorney, Agent, or Firm* — Trop, Pruner & Hu, P.C.

(57) ABSTRACT

In one aspect, an apparatus comprises a transmit path including a power amplifier to receive, process and output a transmit radio frequency (RF) signal the transmit path comprising a power amplifier. A detection circuit coupled to the transmit path may be configured to: detect, during a first portion of a packet of the transmit RF signal, a level of the transmit RF signal at an input to the power amplifier; and detect, during a second portion of the packet of the transmit RF signal the level of the transmit RF signal at an output of the power amplifier. Based at least in part on the detected level at at least one of the power amplifier input or output, a level of at least one component of the transmit path upstream to the power amplifier is to be updated, to control a transmit power variation of the transmit RF signal.

20 Claims, 11 Drawing Sheets

(56) References Cited

U.S. PATENT DOCUMENTS

| | | | |
|---|---|---|---|
| 2018/0192379 A1* | 7/2018 | Gross | H03F 3/24 |
| 2020/0067559 A1 | 2/2020 | Wich et al. | |
| 2022/0214385 A1* | 7/2022 | Hecht | H04B 1/04 |

OTHER PUBLICATIONS

U.S. Appl. No. 17/851,534, filed Jun. 28, 2022, entitled "Providing a Single Filter for Transmit and Receive Modes" in the name of Thomas Edward Voor.

U.S. Appl. No. 17/897,620, filed Aug. 29, 2022, entitled "Configurable Receiver Front End Module having Configurable Detection Capabilities" in the name of Thomas Edward Voor.

U.S. Appl. No. 17/897,637, filed Aug. 29, 2022, entitled "Control of Configurable Receiver Front End Module Based At Least in Part on Signal Metric Information" in the name of Thomas Edward Voor.

U.S. Appl. No. 17/897,652, filed Aug. 29, 2022, entitled "Initialization of Configurable Receiver Front End Module Into a Selected Mode" in the name of Hendricus De Ruijter.

U.S. Appl. No. 17/897,671, filed Aug. 29, 2022, entitled "Reconfiguration of Configurable Receiver Front End Module Between Plurality of Modes" in the name of Hendricus De Ruijter.

U.S. Appl. No. 17/897,693, filed Aug. 29, 2022, entitled "Interrupt Driven Reconfiguration of Configurable Receiver Front End Module" in the name of Hendricus De Ruijter.

U.S. Appl. No. 17/897,721, filed Aug. 29, 2022, entitled "Central Entity Update of Configurable Receiver Front End Module Between Static Modes" in the name of Thomas Edward Voor.

United States Patent Office, Notice of Allowance dated Oct. 13, 2023 in U.S. Appl. No. 17/897,652 (17 pages).

United States Patent Office, Non-Final Office Action dated Dec. 7, 2023 in U.S. Appl. No. 17/851,534 (26 pages).

* cited by examiner

POWER VARIATION CORRECTION FOR A TRANSMITTER

CROSS-REFERENCE TO RELATED APPLICATION

The present application is a continuation-in-part of U.S. patent application Ser. No. 17/851,534, filed on Jun. 28, 2022, the content of which is hereby incorporated by reference.

BACKGROUND

Orthogonal frequency division multiplexing (OFDM) transmitters require high linearity, as systems using such transmitters are susceptible to variations in output power or signal loss of various components, including filters and pre-drivers. Variations can often compound over changes in temperature and supply voltage. For example, a surface acoustic wave (SAW) filter is often included in front of a power amplifier (PA) due to its large gain. This SAW filter can have significant pass band ripple that changes over temperature and operating frequency, and can be a major cause of variation in RF signal level for frequency hopping systems.

These sources of variation can make it difficult to operate consistently near the maximum compliant output power. There are usually two factors that can be the limiting factor. First, regulatory regions limit output power. For example, the FCC limit is 30 dBm for 915 MHz band industrial scientific medical (ISM) radios. The other limit can be hardware linearity, which can vary based on modulation. For example, the IEEE 802.15.4 standard for Wi-SUN OFDM modulations require between approximately −19 dB EVM and −10 dB EVM. The linearity of the PA often limits the achievable output power that still complies with this standard. Normally, the worst case compounded variation of every upstream component must be understood and accounted for. A nominal setting is typically reduced from the maximum allowable by more than this variation to allow for an acceptable safe margin, which can result in lower nominal output power than desired, and lower than what would be achievable under normal conditions.

SUMMARY OF THE INVENTION

In one aspect, an apparatus comprises: a transmit path to receive, process and output a transmit radio frequency (RF) signal, the transmit path comprising a power amplifier to amplify and output the transmit RF signal; and a detection circuit coupled to the transmit path. The detection circuit is configured to: detect, during a first portion of a packet of the transmit RF signal, a level of the transmit RF signal at an input to the power amplifier; and detect, during a second portion of the packet of the transmit RF signal the level of the transmit RF signal at an output of the power amplifier, where based at least in part on the level of transmit RF signal at at least one of the input or the output of the power amplifier, a level of at least one component of the transmit path upstream to the power amplifier is to be updated, to control a transmit power variation of the transmit RF signal.

In an embodiment, the detection circuit is to detect the level of the transmit RF signal at the input to the power amplifier during a first portion of a preamble of the packet of the transmit RF signal. The apparatus may be a front end module having the transmit path and the detection circuit. The front end module may be coupled to a system on chip (SoC) comprising a controller, where the SoC comprises the at least one upstream component. Based at least in part on the level of the transmit RF signal, the controller is to cause the update of the level of the at least one component to occur during a first portion of a preamble of the packet of the transmit RF signal. The controller may be configured to prevent update during a second portion of the preamble following the first portion of the preamble. The controller may be configured to cause a plurality of updates to the level of the at least one upstream component during the first portion of the preamble according to a funneled envelope. The plurality of updates can have a descendingly allowable update range.

In another aspect, a method comprises: receiving, during a preamble of a packet of a transmit RF signal, in a controller coupled to a detector circuit of a RF front end circuit comprising a power amplifier, a plurality of measurements each comprising a level of the transmit RF signal with respect to the power amplifier; for each of the plurality of measurements, determining an update to an upstream component coupled to the power amplifier based at least in part on the level of the transmit RF signal, and causing the update to the upstream component during a first portion of the preamble; and after determining the update and causing the update for each of the plurality of measurements, preventing further update to the upstream component during a remainder of the preamble of the packet.

In an example, causing the update to the upstream component comprises: updating the upstream component with a first gain change; and thereafter updating the upstream component with a second gain change less than the first gain change.

In an example, the method further comprises: limiting the first gain change to less than or equal to a first allowable gain change; and limiting the second gain change to less than or equal to a second allowable gain change less than the first allowable gain change. The method also may include: receiving, in the controller, a notification from a direct memory access (DMA) engine for each of the plurality of measurements; and accessing a memory in response to the notification to obtain a corresponding measurement of the plurality of measurements. The method may further comprise obtaining, via the DMA engine, each of the plurality of measurements in response to timeout of a timer and storing each of the plurality of measurements in the memory.

In an embodiment, the method may further comprise: accessing calibration data of the power amplifier; determining at least one of a voltage or a temperature of the RF front end circuit; and controlling the power amplifier based at least in part on the calibration data and the at least one of the voltage or the temperature.

In an example, causing the update comprises updating the upstream component a maximum number of times within a first symbol of the preamble and thereafter preventing further updates to the upstream component during the preamble, where the maximum number of times is less than five.

In another embodiment, a computer readable medium (e.g., a non-transitory storage medium) includes instructions and/or data that, when executed, cause a device to perform the method of any of the above embodiments. In yet another embodiment, an apparatus comprises means for performing the method of any one of the above embodiments.

In another aspect, a wireless device comprises a first integrated circuit comprising a RF front end module and a second integrated circuit coupled to the first integrated circuit. The RF front end module may include: a transmit path to receive, process and output a transmit RF signal, the transmit path comprising a power amplifier; and a detector circuit to detect a level of the transmit RF signal. The second integrated circuit may include: a host processor; baseband circuitry coupled to the host processor to process an output signal, the baseband circuitry comprising a pre-driver to adjust a level of the output signal; upconversion circuitry to upconvert the output signal to the transmit RF signal; an RF circuit coupled to the upconversion circuitry, the RF circuit to process and output the transmit RF signal to the first integrated circuit; a memory coupled to the host processor; and a controller coupled to the host processor and the memory, the controller comprising an engine, where in response to a plurality of timer expirations during a preamble of the transmit RF signal, the engine is to obtain measurement information regarding a level of the transmit RF signal, store the measurement information into the memory, and inform the controller regarding the storage of the measurement information into the memory. The controller may update a level of at least one of the pre-driver or the RF circuit one or more times during the preamble of the transmit RF signal, based at least in part on the measurement information.

In an embodiment, the first integrated circuit further comprises a non-volatile storage to store compensation data for the power amplifier. The controller may update a level of the power amplifier based at least in part on the compensation data. The controller may further update the level of the power amplifier based at least in part on at least one of a temperature or a voltage of the first integrated circuit. The controller may update the level of the at least one of the pre-driver or the RF circuit in proportion to a difference between the measurement information and a target value.

DETAILED DESCRIPTION

Figure 1:
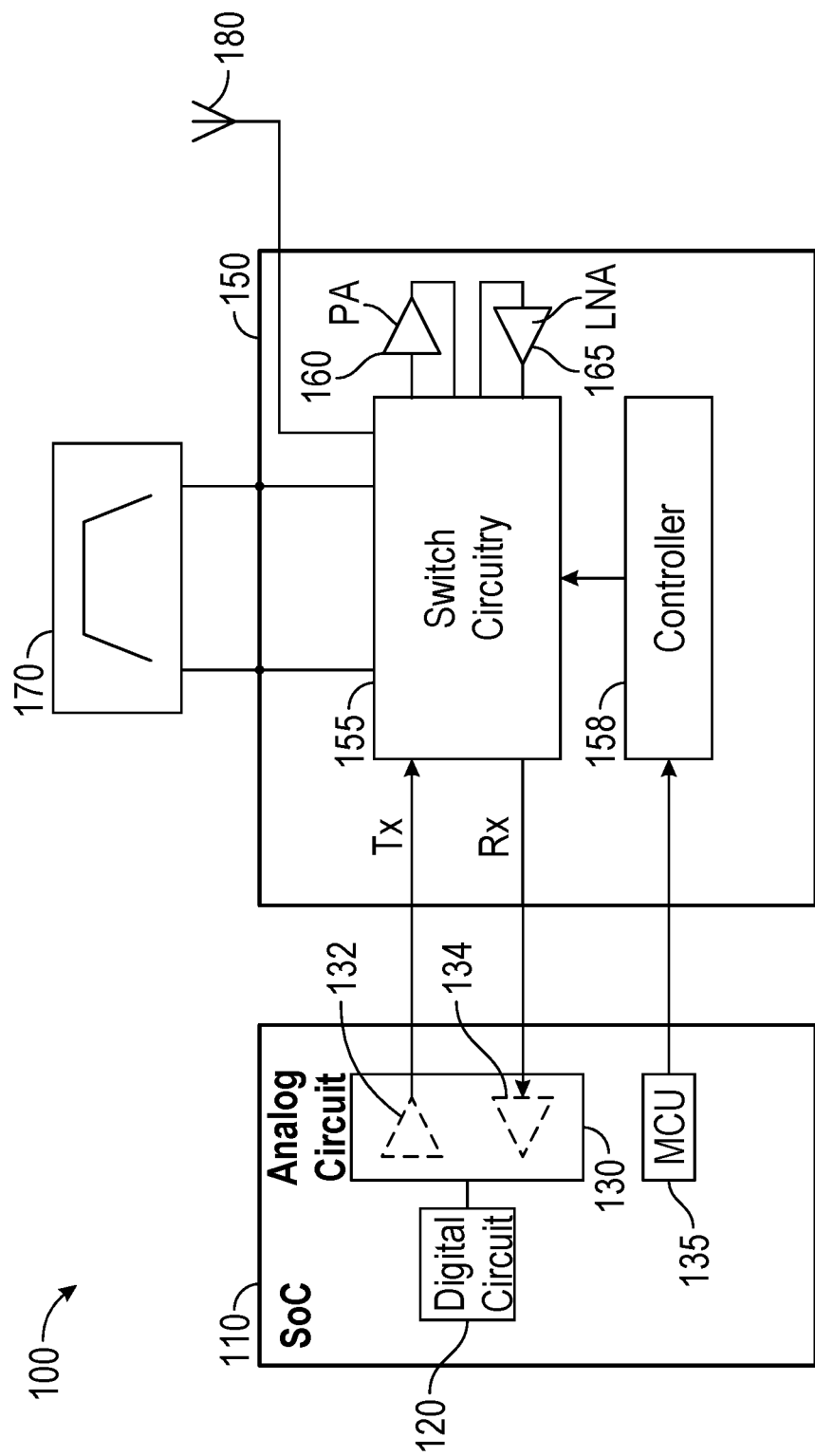
FIG. 1 is a high level block diagram of a portion of a device incorporating an embodiment.

In various embodiments, an integrated circuit having transceiver circuitry may further include switch circuitry to enable both a transmit path and a receive path to use a single off-chip filter. The switch circuitry may be dynamically controlled depending on mode of operation (e.g., receive or transmit) to programmably and dynamically direct appropriate receive or transmit signals to such off-chip filter. In a transmit direction, this single off-chip filter may couple between a transmit driver and a transmit power amplifier. And in a receive direction, this single off-chip filter may couple between a receive port and an on-chip amplifier. Such switch circuitry may be implemented with minimal insertion loss that has minimal effect on system performance.

With embodiments, a single off-chip filter may provide sufficient suppression of spurs for transmit signals, and in a receive mode may provide filtering of blocking signals and enhancing immunity. Although embodiments are not limited in this regard, implementations of a transceiver that include such switching circuitry may be used in a variety of different device types including sub-gigahertz (GHz) industrial scientific and medical (ISM) devices, such as may operate at a frequency range of somewhere between approximately 850 megahertz (MHz) and 925 MHz.

In some implementations, there may be multiple receive modes, including a so-called rural mode which may be used in an environment in which there are relatively few blocking or other interfering signals. In a rural mode, switching circuitry may be controlled to provide a receive path in which an incoming RF signal received via an antenna is provided first to a low noise amplifier (LNA) and then to an off-chip filter. Instead in a so-called urban mode, which may be active when a device is in an urban or other highly congested environment in which there may be potentially many blocking or interfering signals, switching circuitry may be controlled such that an incoming RF signal received via an antenna is first provided to the off-chip filter before being provided to the LNA. A further receive mode may be a bypass mode in which the LNA is bypassed, which may be used when incoming signal strength is sufficiently large. As will be described herein, wireless devices can be controlled, statically or dynamically, to operate in one or more of these receive modes.

By such control, a receiver implementation may realize a good noise figure in a rural environment while the same receiver, differently configured, may realize good blocking in an urban environment. Note also it is possible in both transmit and receive modes for the off-chip filter to be bypassed. Still further, in some situations for a transmit mode an external power amplifier also may be bypassed when a transmit RF signal is received within the RF front end circuit with sufficient power for a given environment. For example, in certain countries, e.g., Japan, an ISM device may have regulatory requirements that limit its output power to 13 dBm (or 14 dBm in Europe). In such an implementation, the external power amplifier can be bypassed. Also in such cases, if a RF signal output from SoC 110 is greater than a certain power level (e.g., 10 dBm), the off-chip filter may be bypassed, to avoid damage that could occur from providing it a signal that exceeds its capability.

Referring now to FIG. 1, shown is a high level block diagram of a portion of a device such as an IoT device incorporating an embodiment. As illustrated in FIG. 1, IoT device 100 may be any type of IoT device that has wireless communication capabilities. In one or more embodiments, IoT device 100 may operate with a radio that uses the same frequency band for transmit and receive (half duplex), as opposed to cellular, which has different frequency for uplink and downlink. While embodiments may vary, the IoT device may be a metering device, an actuator device, a sensor device, wireless microcontroller (MCU), wireless camera, wireless speaker, wireless microphone, wireless lighting controller, lightbulb, or so forth.

In the high level shown in FIG. 1, a system on chip (SoC) 110 couples via an RF front end circuit 150 to an antenna 180, which may be used for both transmit and receive operations. Of course in other implementations, there may be separate antennas for receive and transmit. In the embodiment of FIG. 1, SoC 110 may be implemented in one integrated circuit (IC) and RF front end circuit 150 implemented in another IC. In other cases, both of these components may be implemented in a single IC. In typical cases, the circuitry of SoC 110 may be implemented on one semiconductor die and the circuitry of RF front end circuit 150 may be implemented on a different semiconductor die, whether implemented in separate ICs or in the same IC package. Further, while the specific implementation of FIG. 1 includes an SoC, in other cases, some other type of digital processor such as a baseband processor and/or application processor may be present.

Starting with SoC 110, a digital circuit 120 is present, which may perform the overall processing of the device. Although embodiments are not limited in this regard, the processing may include activities such as performing sensing, metering, controller functionality, actuator functionality or so forth. To enable wireless communication, digital information may be provided from digital circuit 120 to an analog circuit 130. In general, analog circuit 130 may include transceiver circuitry having transmit and receive paths including signal processing circuitry that perform various processing, including digital-to-analog conversion (in the transmit direction) and analog-to-digital conversion (in the receive direction), upconversion and downconversion, filtering, amplification and so forth.

Analog circuit 130 may transform the digital signals to analog form and further perform upconversion and other signal processing to generate RF signals. As seen in FIG. 1, analog circuit 130 may optionally include a power amplifier (PA) 132 that may amplify the incoming RF signals and output them to RF front end circuit 150.

In a receive direction, incoming receive signals that are received in SoC 110 couple to analog circuit 130. As further shown optionally a LNA 134 may be provided for gain control, before additional signal processing is performed. This signal processing may include, e.g., filtering, further gain control, and downconversion to result in digital signals that are provided to digital circuit 120.

RF front end circuit 150 also has transceiver circuitry including transmit and receive paths. With respect to the transmit path, incoming RF signals received from SoC 110 couple through switch circuitry 155. Understand that switch circuitry 155 is shown at a high level, logically as a single block. In practice, a number of different switches may be implemented within RF front end circuit 150 to perform the configurable switching and communication of receive and transmit signals according to different modes, as described further herein. That is, while switch circuitry 155 is shown as a single block, the multiple physical switch instantiations may be located throughout RF front end circuit 150. Also, by way of switch circuitry 155, both receive and transmit paths may leverage a single RF filter 170 coupled to RF front end circuit 150, thus reducing bill of materials (BOM) costs. In various embodiments, RF filter 170 may be implemented as a surface acoustic wave (SAW) filter. While for purposes of discussion, this RF filter is generally referred to herein as a SAW filter, understand that any type of RF filter, including various bandpass or low pass filters can be used.

With respect to the transmit path, RF signals to be transmitted may couple through switch circuitry 155 to SAW filter 170 (optionally), back through switch circuitry 155 and to a PA 160 for further amplification, before being output (through additional circuitry in switch circuitry 155) to antenna 180.

In a receive path, incoming RF signals received by antenna 180 couple into switch circuitry 155. Such receive RF signals, before or after gain control in a LNA 165, may be filtered by SAW filter 170, and pass further through switch circuitry 155 and thereafter be sent to SoC 110, and more specifically to analog circuit 130. Understand that while shown in the high level of FIG. 1 with a single LNA 165, in some cases there may be multiple LNAs that can be controllably coupled with SAW filter 170. For example, a received RF signal may pass through a first LNA, then through SAW filter 170, and then through a second LNA before being provided to SoC 110. And such multiple LNAs can be controlled to be bypassed, such that none, one, or both such LNAs may be part of a receive path.

In some cases, SoC 110 may provide an output signal at a power level of approximately zero dBm, which can be amplified both within PA 132 of analog circuit 130 of SoC 110 and PA 160 (or in cases, PA 160 may be bypassed). Note that in some cases, SAW filter 170 may be designed to only withstand approximately 10 dBm of power, such that in the transmit direction the transmit RF signal may be filtered in SAW filter 170 prior to further amplification.

As further shown in FIG. 1, SoC 110 may include a microcontroller unit (MCU) 135. Among its duties, MCU 135 sends mode control signals to RF front end circuit 150. As seen, these signals may be provided to a controller 158 (which may be implemented as a microcontroller, finite state machine or so forth). In response to such control signals, controller 158 may dynamically configure and reconfigure switch circuitry 155 to operate in a given one of a transmit or receive mode (as RF front end circuit 150 can only operate in a transmit or receive direction at any given time). Still further, in various implementations there may be multiple receive modes and potentially multiple transmit modes available and which may entail different configurations of switch circuitry 155. Understand while shown at this high level in the embodiment of FIG. 1, many variations and alternatives are possible.

Figure 2:
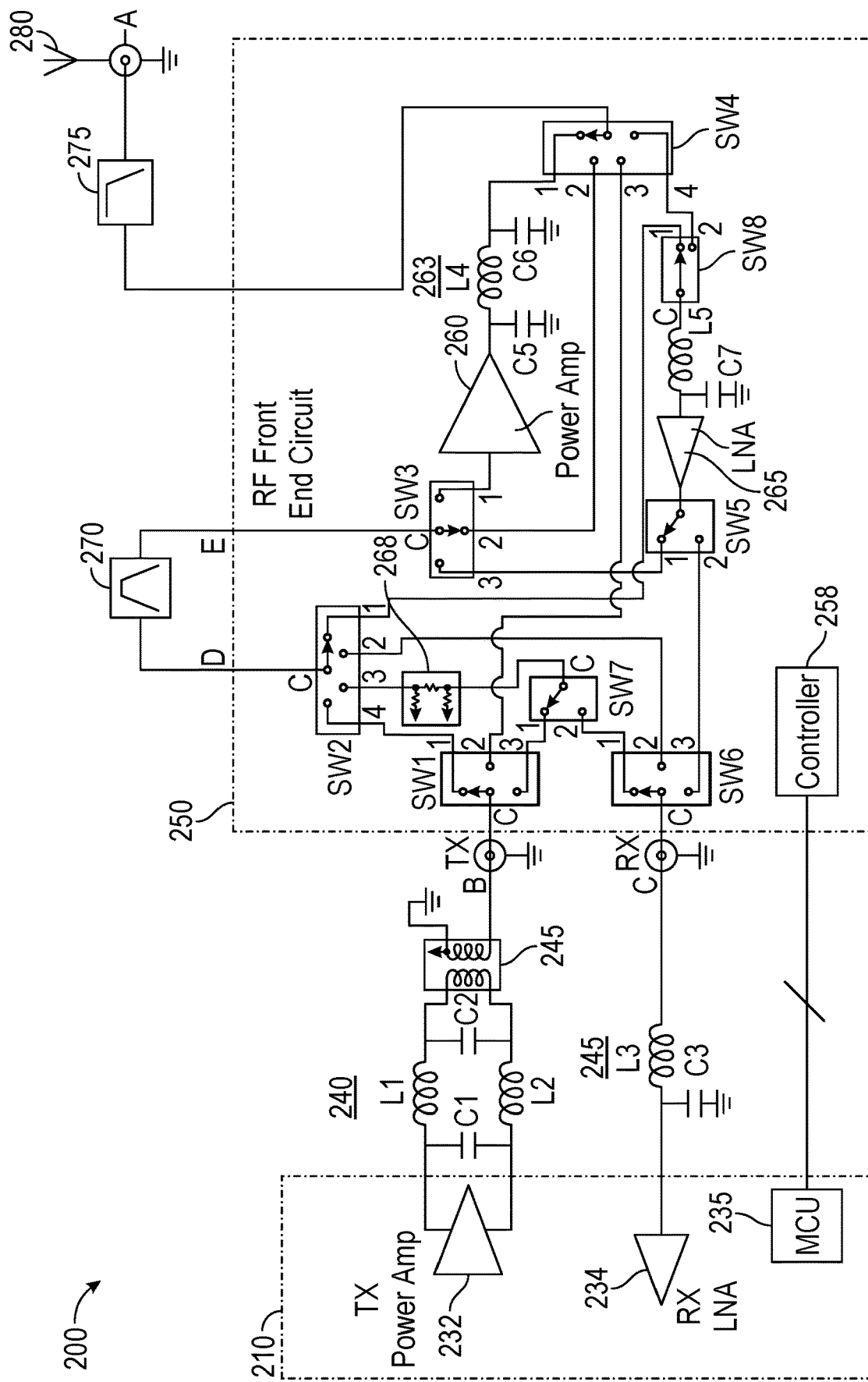
FIG. 2 is a schematic diagram illustrating further details of a switch arrangement in accordance with an embodiment.

Referring now to FIG. 2, shown is a schematic diagram illustrating further details of a switch arrangement in accordance with an embodiment. As shown in FIG. 2, a device 200 shows a more detailed view of a switch circuit implementation. In general, device 200 may be a similar IoT device as device 100 of FIG. 1, and thus to the extent that the same numbering conventions are used in FIG. 2 (although of the "200" series rather than the "100" series of FIG. 1), like components are shown and in some cases are not further discussed below.

At a high level, device 200 includes an SoC 210, an RF front end circuit 250, a SAW filter 270, and an antenna 280. SoC 210 is shown in the illustration of FIG. 2 as having a transmit power amplifier 232 and a receive LNA 234.

In the transmit direction, PA 232 outputs a differential RF signal that couples through a differential impedance match circuit 240 (formed of inductors L1, L2 and capacitors C1, C2). The matched differential RF signal is converted to single-ended form via a balun 245. The resulting single-ended transmit RF signal couples to RF front end circuit 250 via a transmit port B, which also may be used as a test port.

In the transmit direction, RF front end circuit 250 includes a transmit signal path including various switches and other circuitry to process and direct the transmit RF signal to its destination, namely, antenna 280. More specifically, with reference to FIG. 2, the transmit RF signal may couple through switches SW1 and SW2 (either with attenuation via an attenuator 268 using additional switch SW7, or unattenuated) to be directed to SAW filter 270 (via off-chip ports D and E, respectively). In an embodiment SAW filter 270 may be a bandpass filter configured to pass a band appropriate for a given device (e.g., between 875 and 950 MHz). After being filtered in SAW filter 270, the filtered transmit RF signal couples through switch SW3 and to power amplifier (PA) 260, before being output through matching circuitry 263 (including inductor L4 and capacitors C5, C6). From there, the amplified transmit RF signal couples through switch SW4 and is output from RF front end circuit 250 and through a low pass filter (LPF) 275 to antenna 280 coupled to a port A. In an embodiment, LPF 275 may be a third order low pass harmonic filter having a typical loss level of approximately 0.5 dB. Note that the position of LPF 275 and SAW filter 270 may not be swapped, as in some use cases, the RF signal level that passes through LPF 275 would cause damage to SAW filter 270.

Still with reference to FIG. 2, in a receive direction, incoming RF signals pass through antenna 280 and LPF 275 and into RF front end circuit 250. In the receive direction, the incoming receive RF signal couples through switch SW4 and, depending upon mode, either directly to LNA 265 (via switch SW8) or via switch SW3 to SAW filter 270 (and thereafter through switches SW2 and SW8) and then to LNA 265. This determination may be based on whether filtering is desired before or after amplification in LNA 265.

As seen, it is further possible for the amplified receive RF signal output by LNA 265 to pass through switches SW5 and SW3 to SAW filter 270. In yet other cases, SAW filter 270 may be bypassed in the receive direction, such that the amplified receive RF signal is provided directly from switches SW4 and SW8 through LNA 265 and through switches SW5 and SW6, and thereafter off-chip through an impedance matching circuit 245 formed of inductor L3 and capacitor C3 to SoC 210, and more specifically, to LNA 234.

Still further it is possible in the receive direction for attenuation to occur via attenuator 268 that couples between switch SW2 and switch SW7 and in turn, provides the attenuated receive RF signal to SoC 210 through switch SW6. While switches SW1-SW8 are illustrated in FIG. 2 as various single pole multiple throw (P/T switches), other types of switches may be used.

Of course while shown with this particular implementation with the above-described paths through RF front end circuit 250, switching circuitry may take various forms to enable transmit and receive paths to share a single SAW filter, reducing costs and complexity. However embodiments are not limited in this regard, and it is possible there to be multiple filters present. Furthermore, it is possible by way of different control of the various switches to enable both transmit and receive RF signals to pass through the respective transmit and receive paths in different orders.

Still referring to FIG. 2, controller 258 may dynamically configure the various switches to enable operation in a desired transmit or receive mode, as well as sub-modes that may be available in a given implementation. To this end, controller 258 receives incoming front end control signals from SoC 210 (more specifically from MCU 235).

In response to these control signals, controller 258 may control the various switches as described above. In a particular embodiment, MCU 235 may output four front end mode control signals. Controller 258, based at least in part on these control signals, may dynamically configure the switches of RF front end circuit 250 accordingly. With four control lines being provided to controller 258, there may be sufficient programmability for 16 different modes, with approximately half of these modes available for transmit operations and half available for receive operations. Or certain states can be reserved for other modes such as testing or measurement modes.

Figure 3:
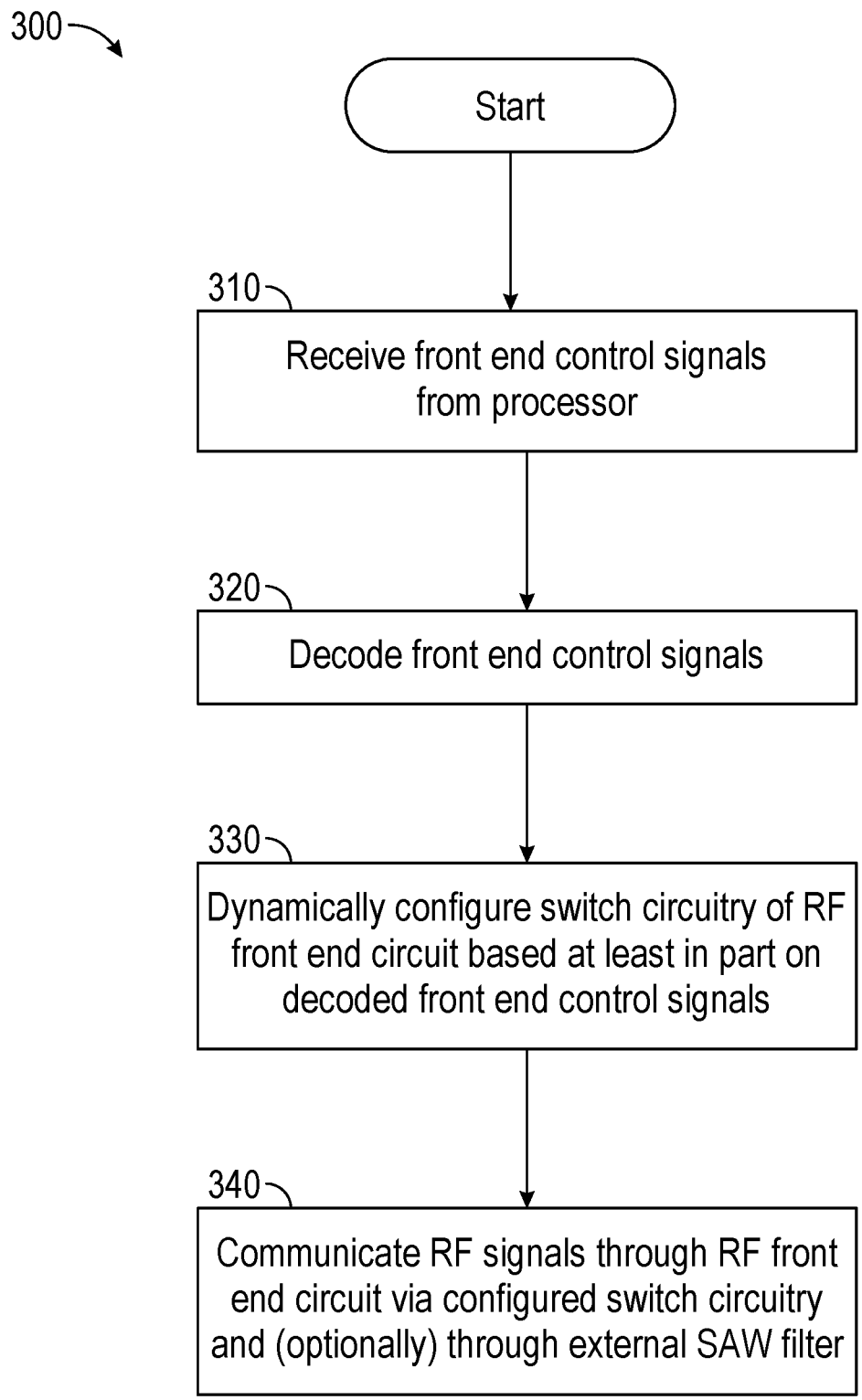
FIG. 3 is a flow diagram of a method in accordance with an embodiment

Referring now to FIG. 3, shown is a flow diagram of a method in accordance with an embodiment. As shown in FIG. 3, method 300 is a method for controlling switch circuitry of an RF front end circuit such as may be performed by a controller or other hardware circuit within the RF front end circuit. In some cases, the controller may execute instructions stored in a non-volatile memory. In an embodiment, this non-volatile memory may be implemented as a non-transitory storage medium that can store instructions and data. Such non-volatile memory may store instructions, including instructions for receiving mode control signals and controlling switch circuitry in response to the mode control signals, as described herein.

As illustrated, method 300 begins by receiving front end control signals from a processor (block 310). As discussed above, there may be a plurality of control lines that provide control signals to indicate a desired mode and sub-mode, namely transmit or receive mode, and potential sub-modes including any bypass modes, urban/rural modes or so forth. Next at block 320, the front end control signals may be decoded, e.g., in the controller of the RF front end circuit.

Still with reference to FIG. 3, control passes to block 330 where switch circuitry of the RF front end circuit may be dynamically configured based at least in part on these decoded signals. In an embodiment as in FIG. 2, the single pole multiple throw switches may be controlled to provide a selected connection between a common port and a given one of the available throw ports. At this point the RF front end circuit is appropriately configured for operation in a given mode. As such, at block 340 RF signals may be communicated through the RF front end circuit via this configured switch circuitry. In this way, transmit or receive RF signals may pass through at least some of the switch circuitry according to a desired path such that the RF signals may optionally pass through a single external SAW filter, which may be used for both transmit and receive modes. Understand while shown at this high level in the embodiment of FIG. 3, many variations and alternatives are possible.

Embodiments may be configured to measure, via detection circuitry, RF signal level at a PA when a transmit (TX) packet begins and compare it to a target value. If too low, one or more upstream components (with respect to the PA) may have a level increased, and if too high the level is decreased. One example upstream component is a pre-driver, which may be a digitally controlled pre-driver present in the SoC. Of course, other upstream components also may be controlled to accommodate transmit power variation. The amount of change to the pre-driver level can be proportional to the difference between the measured RF level and the target level. With embodiments, this RF level adjustment may happen very quickly, so as to not interfere with a target receiver's ability to adjust or set AGC levels.

Understand that in different implementations, the RF level detector may be present at an input and/or output of a PA. This RF level detector may be more accuracy in measuring RF level over all the operating conditions than the ability to accurately set the RF level of the upstream components over the operating conditions.

Embodiments may be applicable to many modulations and PHYs. For example, consider a Wi-SUN OFDM implementation. In such example, a TX packet starts with four symbols of a short training field, with each symbol being 120 microseconds (uSec) in duration. The level detector measurements and the TX level adjustments may be controlled to occur during the first of the four short training field symbols, in one example. In one or more embodiments, there can be a few adjustments of TX level with limited range, which narrows as a funnel over time to further guard against confusing prospective receivers.

Figure 4:
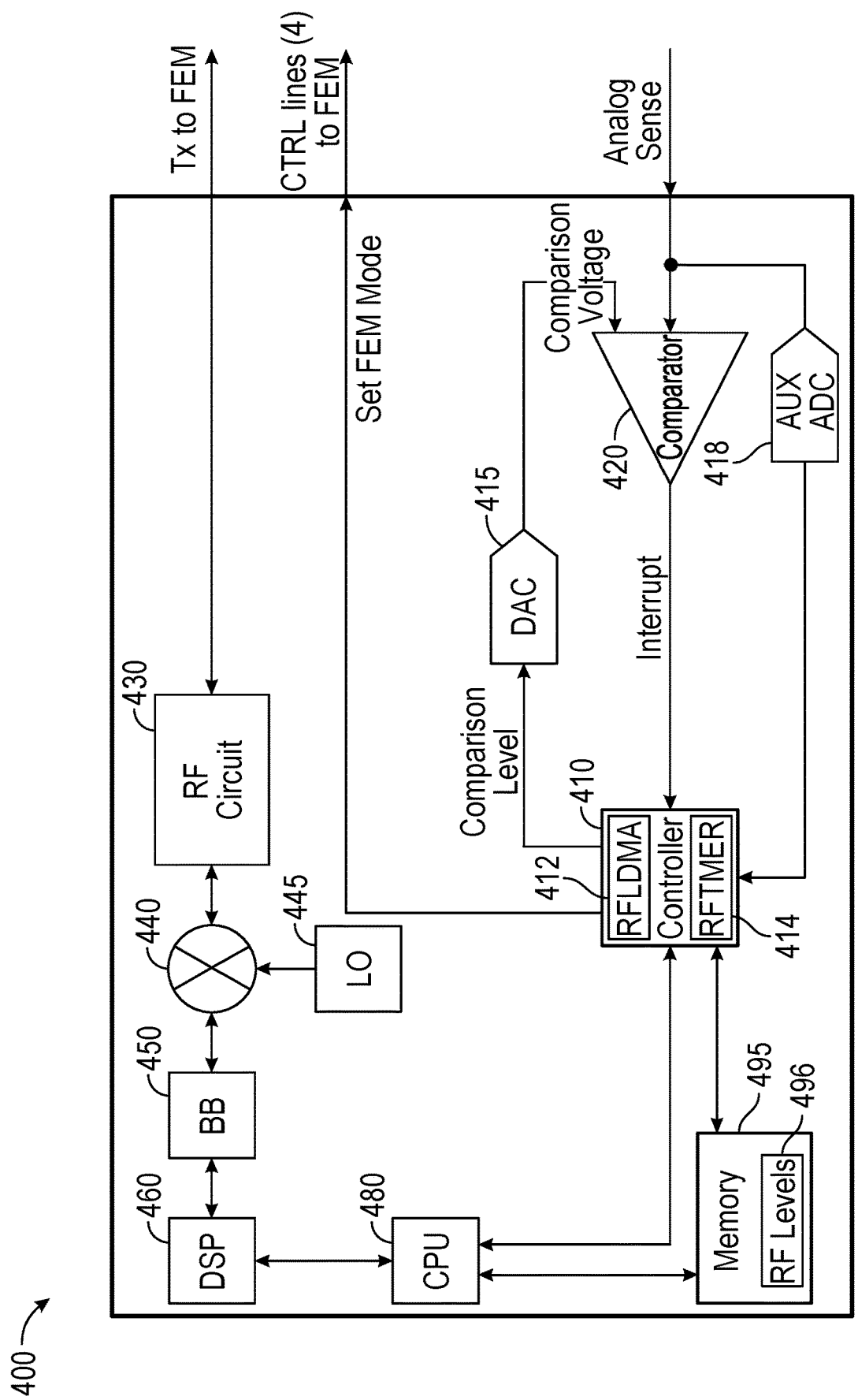
FIG. 4 is a block diagram of a system on chip in accordance with an embodiment.

Referring now to FIG. 4, shown is a block diagram of a system on chip in accordance with an embodiment. As shown in FIG. 4, SoC 400 includes a controller 410, which may be a radio processor, e.g., implemented as a sequencer (which in one embodiment may be implemented as an embedded ARM M0 central processing unit (CPU)) that is configured to control radio operations including the power variation correction as described herein. In one or more embodiments, controller 410 may execute instructions stored in a non-transitory storage medium. Such instructions that are used to perform radio control may be implemented as firmware and/or software.

With further reference to FIG. 4, an auxiliary analog-to-digital converter (ADC) 418 receives an incoming analog sense signal, which for purposes herein may be assumed to be a power level detected by one or more RF detectors associated with the transmit path of the front end module. Such one or more detectors may be coupled (or controllably coupled) to an input and/or an output of the PA. ADC 418 digitizes this received power level, which may be in the form of a voltage signal (obtained from the input or output of the PA) or a current signal (obtained from the PA output).

In any event, ADC 418 provides the digital value of the detected power level to controller 410. More specifically as shown in FIG. 4, controller 410 includes an engine 412, which in the embodiment shown is a linked direct memory access (LDMA) engine, e.g., an RFLDMA engine. In embodiments herein, engine 412 may be configured to become active in response to a timer timeout, namely an RF timer signal as maintained by an RF timer 414. On such timeout, engine 412 may read the digital output of auxiliary ADC 418 and provide it for storage in a table 496 present in a memory 495. In various embodiments, memory 495 may be internal to SoC 400 or may be implemented as a dynamic random access memory (DRAM) coupled to SoC 400. Also on writing the power level value to memory 495, RFLDMA engine 412 may issue an interrupt to controller 410 to wake it up such that it may access this power level to perform the power variation correction described herein.

Still referring to FIG. 4, controller 410 also may control operation modes of the front end module based at least in part in response to detected RF levels received via the analog sense input. As shown, feedback information from the front end module can also be provided to an analog comparator 420 which further receives a comparison voltage generated by a digital-to-analog converter (DAC) 415. Controller 410 may provide a comparison level signal to DAC 415 to cause it to generate the comparison voltage at a given level. More specifically, DAC 415 may generate a reference voltage signal, namely a given one of multiple threshold levels depending upon mode of operation, under control of controller 410.

In various embodiments, comparator 420 performs comparisons continuously without any processor required, improving response time. If a detected RF signal level exceeds a given mode threshold, comparator 420 sends an interrupt to controller 410. Once controller 410 is notified of this interrupt, it chooses a next mode, and sends a message to indicate the mode change to the front end module. In an embodiment, this message may be a communication of control signals such as a 4-bit signal on the FEM CTRL0-3 lines.

Still referring to FIG. 4, a transmit RF signal path is highlighted to show communication of transmit RF signals to a front end module (of course, a receive path also may be present). In this transmit RF signal path, information from a main CPU 480 can be processed in a digital signal processor (DSP) 460, output signals from which are provided to a baseband processor 450 (which may include a digital-to-analog converter (DAC) to convert IQ signals output from DSP 460 to analog IQ signals).

Thereafter the output signals are upconverted in a mixer 440 that receives a mixing signal from a local oscillator (LO) 445. The upconverted signals output from mixer 440 may be provided to an RF circuit 430, which may include one or more programmable gain stages and/or drivers that may be controlled to provide transmit power variation correction as described herein.

In different implementations, gain control circuitry, whether implemented as an amplifier in RF circuit 430 or included in baseband circuit 450, may have a level updated as described herein. The transmit RF signal is sent to the front end module for further processing and amplification in a PA, and is then transmitted via an antenna. Understand while shown at this high level in the embodiment of FIG. 4, many variations and alternatives are possible.

Figure 5:
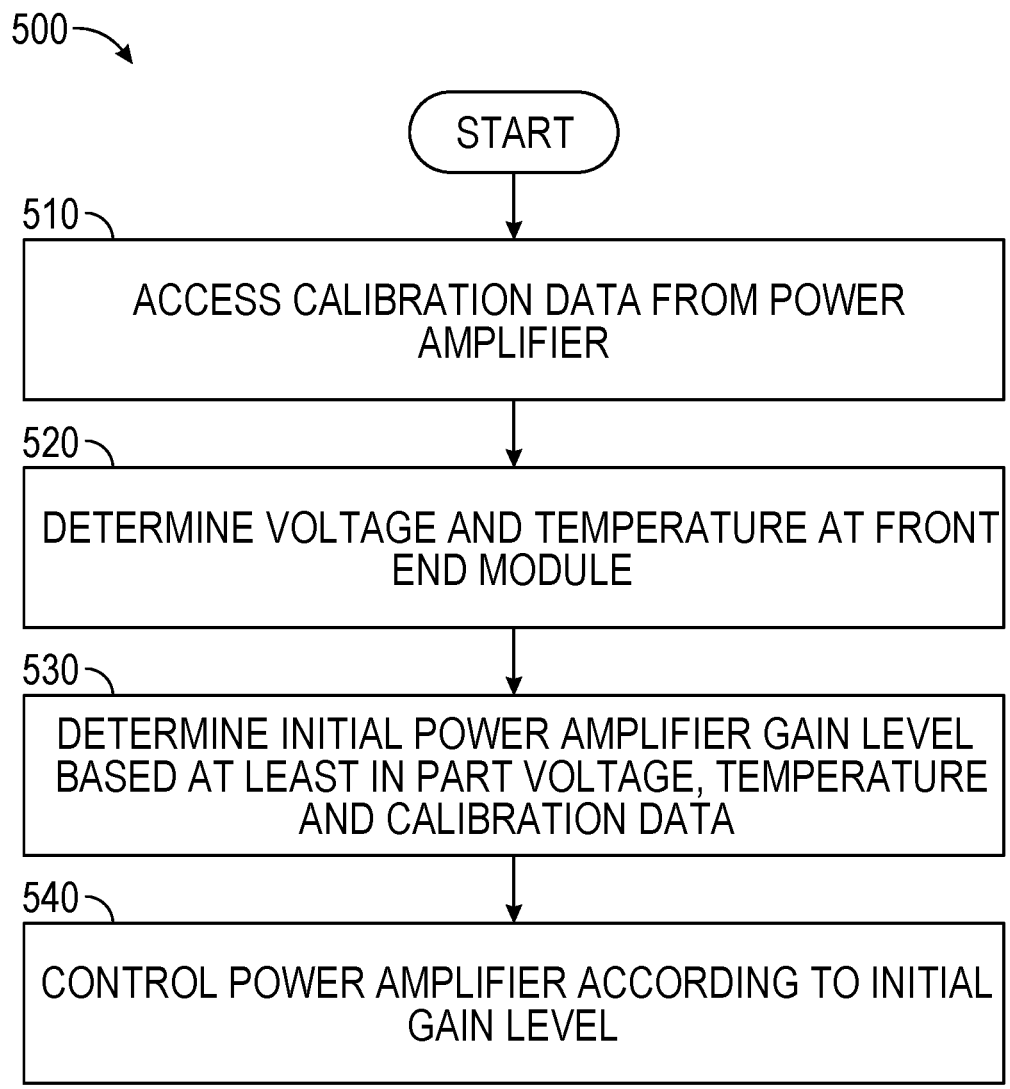
FIG. 5 is a flow diagram of a method in accordance with an embodiment.

Referring now to FIG. 5, shown is a flow diagram of a method in accordance with an embodiment. More specifically as shown in FIG. 5, method 500 is a high level method for performing transmit power control for a PA of a front end module. In one or more embodiments, method 500 may be performed by a control circuit, such as a radio processor included in the front end module or an SoC coupled to the front end module.

Method 500 begins by accessing calibration data from the power amplifier (block 510). For example, a front end module including an integrated power amplifier may have a non-volatile storage to maintain such calibration data, e.g., as fuse information. This calibration data may be obtained during manufacturing testing and programmed into the front end module. In an embodiment, this calibration data may be accessed on power up of a wireless device, and the controller may store it in a table of a memory. Next at block 520, environmental information may be determined. More specifically, a voltage and temperature of the front end module may be determined, e.g., based on sensed information from one or more temperature sensors and a measured voltage such as a supply voltage provided to the front end module.

Still with reference to FIG. 5, next at block 530 an initial power amplifier gain level may be calculated. More specifically, this initial gain level may be calculated based at least in part on the voltage, temperature and calibration data. To this end, the controller may determine the gain level using the calibration data as a slope value to adjust a nominal initial gain level based on the voltage and temperature. Next at block 540, the controller may control the power amplifier according to this initial gain level. For example, one or more control signals may be sent to the power amplifier to cause it to operate according to the requested gain level.

Understand that based on operating requirements such as maximum power restrictions, linearity maintenance and so forth, this initial gain control provided to the PA may not reflect variations that can occur. Accordingly, embodiments may further control one or more upstream components to the power amplifier to provide power variation correction.

Figure 6:
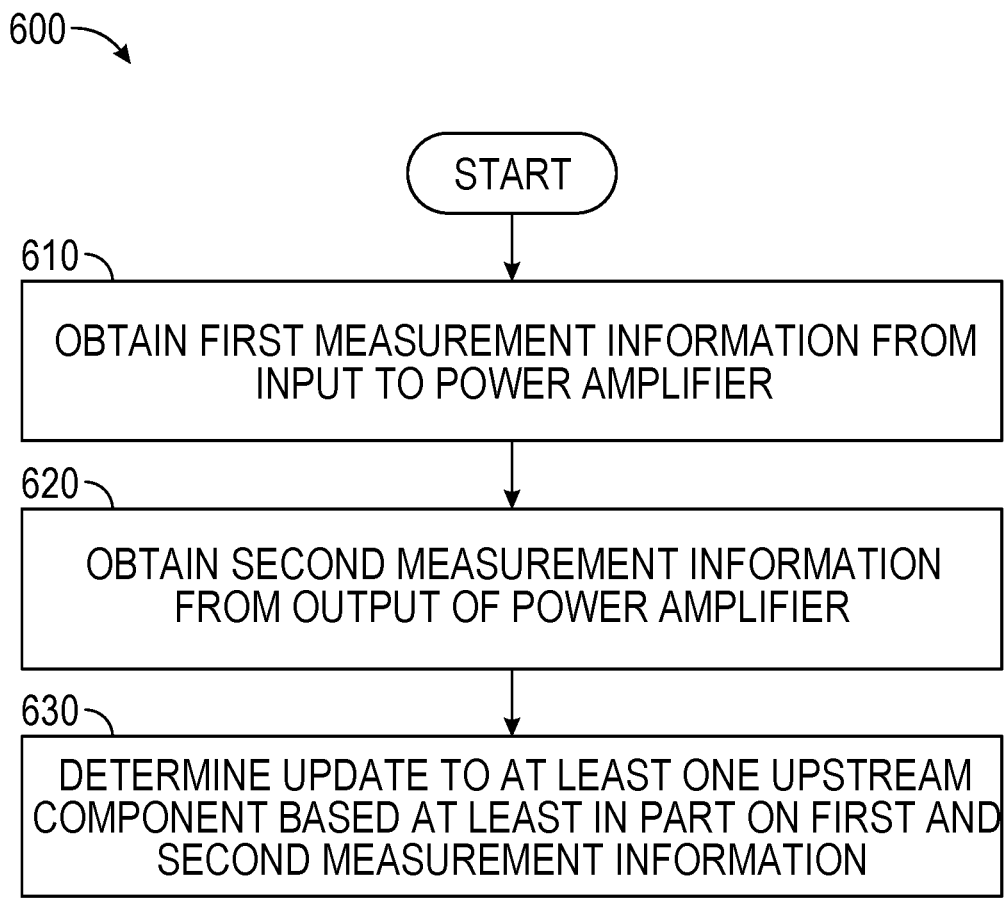
FIG. 6 is a flow diagram of a method in accordance with another embodiment.

Referring now to FIG. 6, shown is a flow diagram of a method in accordance with another embodiment. More specifically as shown in FIG. 6, method 600 is a high level method for performing dynamic transmit power control for the PA. In one or more embodiments, method 600 may be performed by a control circuit, as discussed above.

As illustrated, method 600 begins by obtaining first measurement information from an input to the power amplifier (block 610). This first measurement information may be obtained from an RF peak detector coupled to an input to the PA. As discussed above, e.g., with regard to FIG. 4, the RF detector may provide this information as an analog sense signal (e.g., a voltage) that can be digitized and provided to the controller. Then at block 620, second measurement information may be obtained from an output of the power amplifier (e.g., the same or different RF peak detector and/or a current sensor).

Still with reference to FIG. 6, at block 630, an update to at least one upstream component (e.g., a pre-driver) may be determined. More specifically, based on the first and second measurement information, a control value for the upstream component may be determined applied to update a level of the upstream component. To this end, one or more of the measurement information may be compared to one or more thresholds. When the measurement information exceeds a given threshold, a downward change to a level of the upstream component may occur, and vice versa.

Thus in FIG. 6, RF voltage levels from input and output of the PA and potentially an RF current probe value measured at the output of the PA can be used to robustly measure and control transmit settings. Having both voltage and current measurements can provide immunity to unknown antenna load changes. In various embodiments, a combination of measurements of PA input signal level, and output RF voltage and output RF current can be used. While in the implementation of FIG. 6, both first and second measurement information are obtained and used in determining such power variation correction updates, embodiments are not limited in this regard. In other implementations, only a single type of measurement information (from either the input or output of the PA) may be obtained and used to determine such updates.

As discussed above, there may be interaction between a radio processor and a DMA engine, with the radio processor configuring the DMA engine to obtain measurements of the power level associated with the PA and store them in a memory accessible to the radio processor which may then perform the power variation correction techniques described herein.

Figure 7:
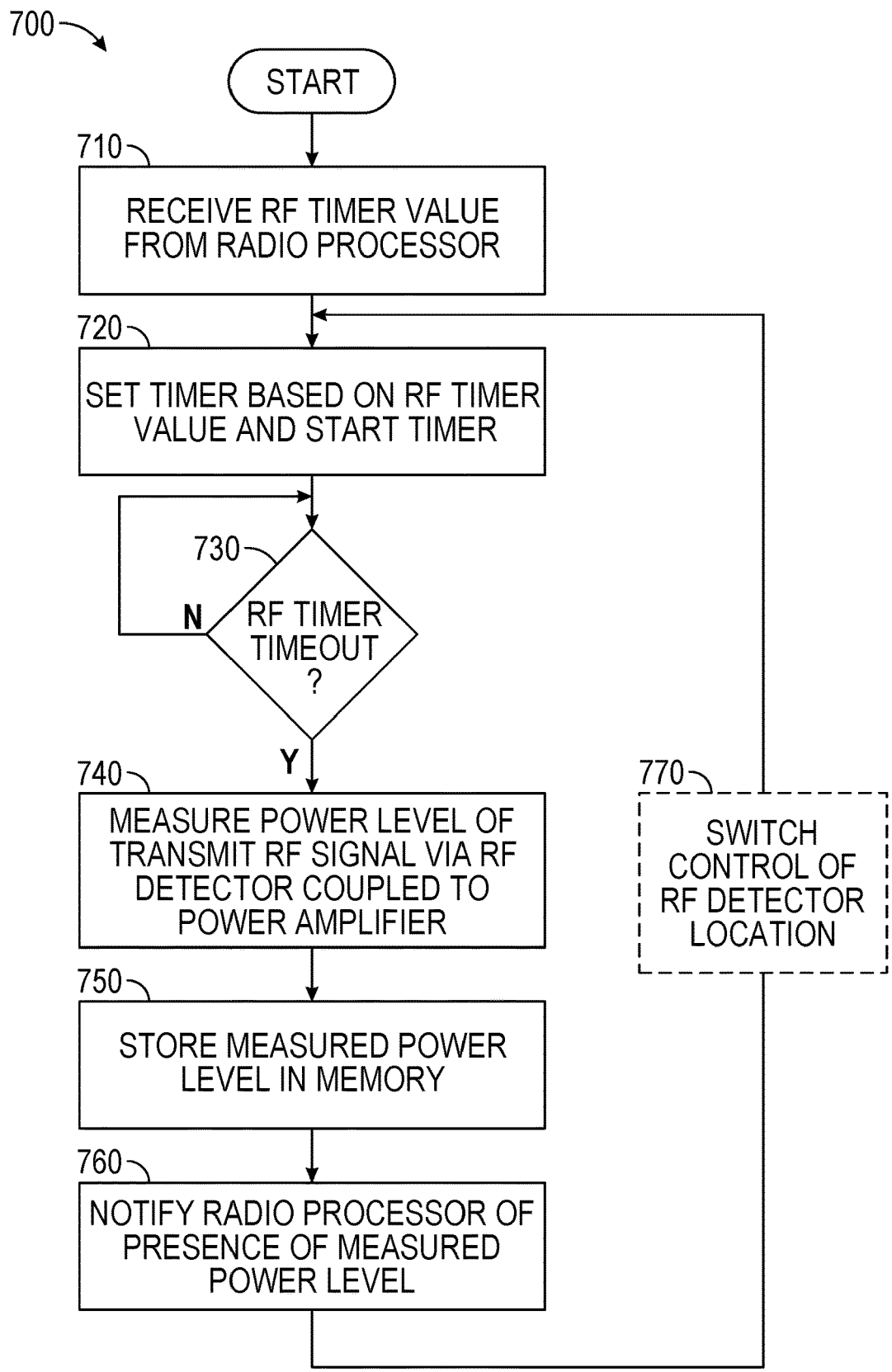
FIG. 7 is a flow diagram of a method in accordance with yet another embodiment.

Referring now to FIG. 7, shown is a flow diagram of a method in accordance with yet another embodiment. More specifically as shown in FIG. 7, method 700 is a method for obtaining power level information and storing it into a memory, which may be performed by circuitry of a radio processor. In an embodiment, a DMA engine of the radio processor can perform method 700. This DMA engine can be implemented as a custom control chain converted statically from a configuration file into a header file included in software builds. This control chain can be started by the radio processor but requires no further interaction until the control chain notifies the radio processor when each measurement is completed. This allows the radio processor to continue normal operation, enter a lower power state, or work on previous measurements, instead of monitoring the measurement process.

At a high level (described more fully below), this RFLDMA engine waits for a timer to reach a match value before starting a measurement. Once the measurement completes, the RFLDMA engine copies the measurement into a processor memory and notifies the processor which measurement is now available. Once that is finished, the RFLDMA engine loads the next match value into the timer, allowing the RFLDMA engine to control its own timing. Various chains can be dedicated to specific tasks, such as measuring temperature and power supply voltage or droop. The transmit level can be compensated for operating temperature and power supply voltage conditions, or other controls, such as preventing transmission if temperature is too high. These can be separate chains or combined together. Different chains may be used for different physical layer options.

Once the radio processor has the new measurement, it converts it to a precision voltage. This voltage number is then used to control the loop that sets the power at the input to the PA dynamically during a transmit packet. In an embodiment, a comparator may compare a current measurement against a target number, and make a power adjustment, e.g., based on a supplied slope, to correct the power delivered to the input of the PA.

As illustrated, method 700 begins by receiving an RF timer value from a radio processor (block 710). This RF timer value may be set to a duration of a time period between samples of the measurement information. At block 720, the DMA engine may set a timer based on the RF timer value and start the timer. In one example the RF timer may maintain this time duration, referred to as RFTIMER, which provides precision absolute timing (or alternatively, the timing can be with respect to the modulation) to start level detector measurements. In one or more embodiments, a typical value of this RF timer may be between approximately 10 to 120 microseconds, depending on preamble length.

In an embodiment, this beginning of the timer may correspond to the beginning of a packet communication, namely during a preamble portion of a packet, such that the power variation correction determined herein may be completely performed within the preamble portion of the packet, so as to enable receivers to perform appropriate gain control and other operations during the preamble to improve fidelity of packet communication.

At diamond 730, it may be determined whether this RF timer has timed out. When it has, control passes to block 740 where a power level of the transmit power signal may be measured. More specifically, this power level may be measured via an RF detector coupled to the power amplifier (e.g. an input or an output). Next at block 750, this measured level when digitized may be stored into a memory. Finally, at block 760, the radio processor may be notified of the presence of this measured power level.

Still with reference to FIG. 7, optionally at block 770, a radio processor may switch control of the RF detector location. For example, for each of the RF timer durations the RF information may optionally be obtained from the input or output of the PA. Understand while shown at this high level in the embodiment of FIG. 7, many variations and alternatives are possible.

Figure 8:
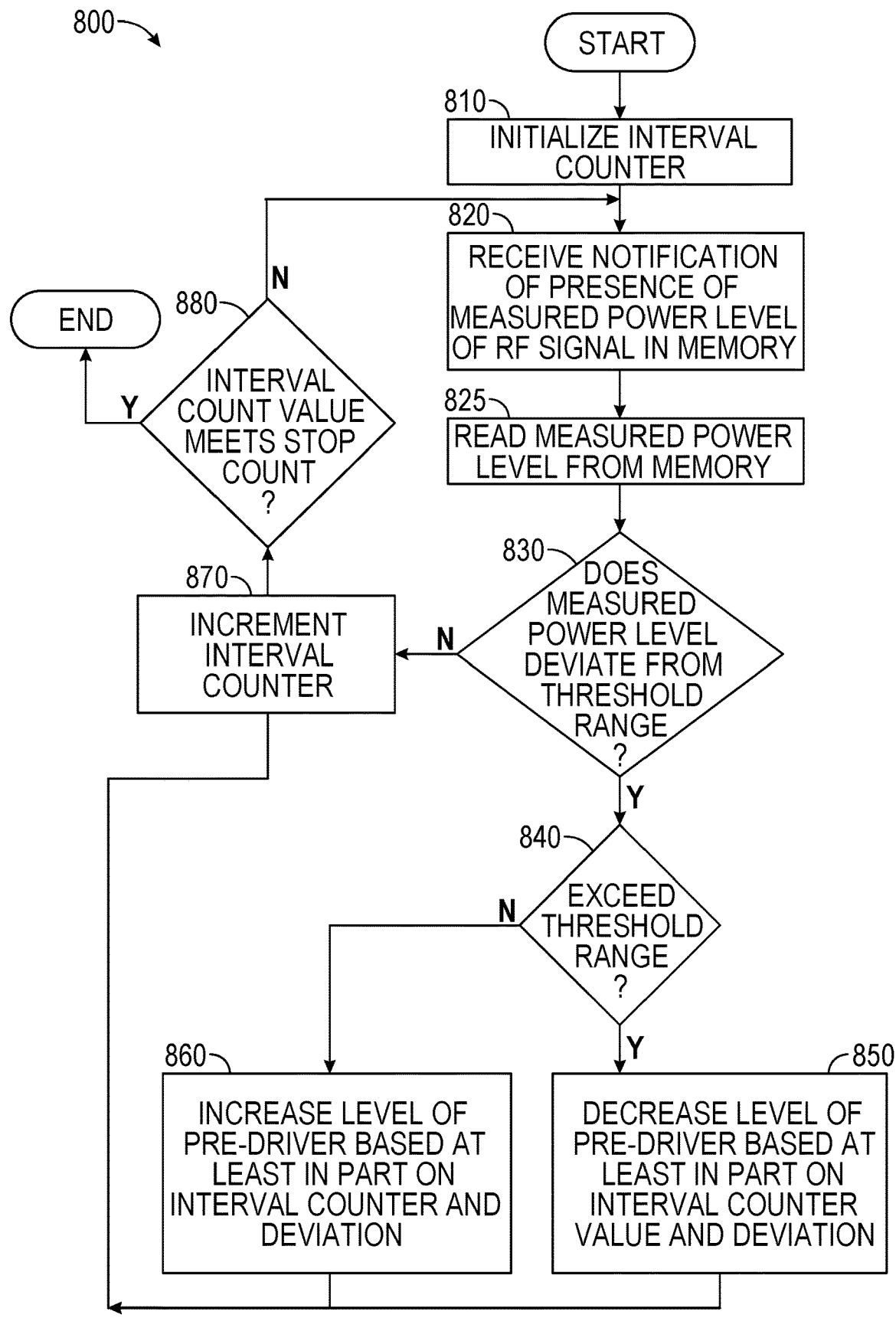
FIG. 8 is a flow diagram of a method in accordance with a still further embodiment.

Referring now to FIG. 8, shown is a flow diagram of a method in accordance with yet another embodiment. More specifically as shown in FIG. 8, method 800 is a method for dynamically controlling transmit power by adjustment to one or more upstream components, where the control may be performed by circuitry of a radio processor, in an embodiment. As illustrated, method 800 begins by initializing an interval counter (block 810). This interval counter may count the number of gain changes that are allowed to occur during a packet preamble. As discussed above, only a minimal number of gain change updates can occur during a preamble. In one example embodiment, there may be, at most, four gain control updates allowed during the preamble portion of a packet.

After initialization of the interval counter (e.g., to an initial value of 1), control passes to block 820. At block 820, the processor may receive a notification of the presence of a measured power level of the RF signal, which as discussed above, may be stored into a memory by the DMA engine. In one embodiment, this notification may be an interrupt received from the DMA engine.

Still with reference to FIG. 8, in response to this notification at block 825, the processor may read the measured power level from the memory. Next at diamond 830, it may be determined whether this measured power level deviates from a threshold range. By use of such a range, a level of hysteresis can be accommodated so that small changes do not cause unnecessary updates. If the measured power level does not deviate from the threshold range, control passes to block 870 where the interval counter may be incremented.

Instead if the measured power level does deviate from the threshold range, control passes to diamond 840 to determine whether the measured power level exceeds the threshold range. If so, control passes to block 860 where a pre-driver level may be increased. This increase may be based at least in part on the interval counter and the size of the deviation. That is, there may be at most only a few gain control updates allowed during a preamble of a packet. Furthermore, larger gain changes are allowed for a first iteration with successively smaller gain changes allowed for later iterations, details of which are described further below. If the measured power level is below this threshold, at block 850 the pre-driver level may be decreased.

In either case, control passes to block 870, where the interval counter is incremented. Then it may be determined at diamond 880 if the interval count value meets the stop count corresponding to the maximum allowed number of gain control updates (e.g., four). When such update events have occurred, method 800 concludes. Otherwise, control passes back to block 820 discussed above. Understand while shown at this high level in the embodiment of FIG. 8, many variations and alternatives are possible.

Figure 9:
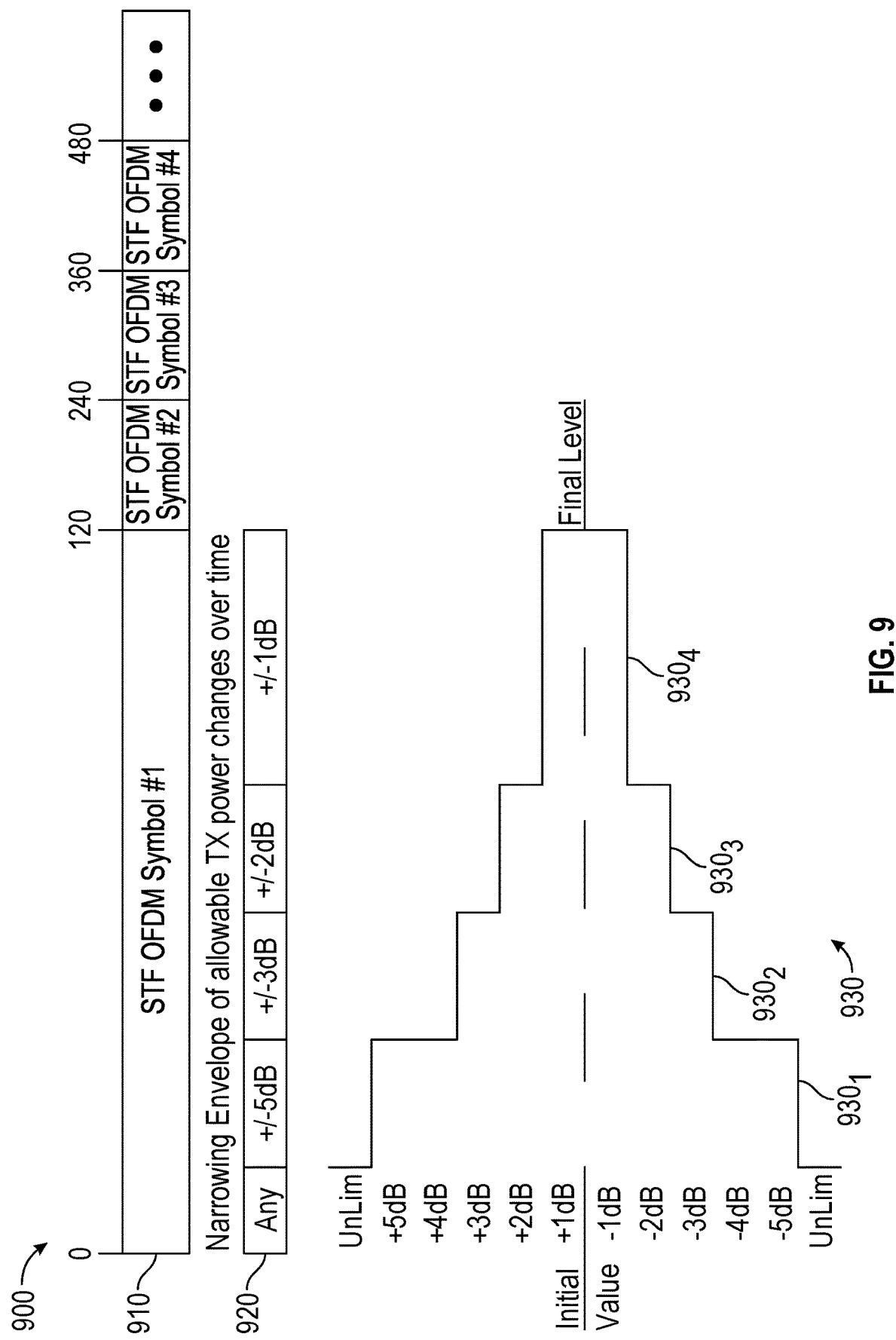
FIG. 9 is a timing diagram illustrating a time window in which gain control updates are allowed to occur according to an embodiment.

Referring now to FIG. 9, shown is a timing diagram illustrating the limited window in which gain control updates are allowed to occur during a packet communication. As illustrated in timing diagram 900, an OFDM packet 910 has a plurality of symbols of a preamble that may be implemented as a short training field (STF), in a Wi-SUN communication scheme. Understand that the preamble is followed by a payload formed of another plurality of symbols.

Although there are a number of symbols that form this preamble, gain control (illustrated at envelope definition 920) may only occur during a first symbol. As further shown in FIG. 9, a narrowing envelope 930 of gain control changes is allowed during this symbol. Note that prior to narrowing envelope 930, unlimited gain changes may occur. Then as illustrated, during a first portion of envelope 930 (9301), a gain change of +/−5 dB is allowed. Thereafter smaller gain changes, down to a final allowable gain change of +/−1 dB at gain change 9304, occur. In one or more embodiments, measurements of RF signal level may be synchronized to the timing of the modulation, its headers, and training symbols.

Note that a change in signal level of 2 dB would normally not affect a potential Wi-SUN OFDM receiver's AGC algorithm. If receivers do begin to acquire during this adjustment period, there are 3 remaining short training symbols for the receivers to continue to lock on, and there are no adjustments in this TX signal level during these three later symbols. Once the signal level is well controlled at the input to the PA, the remaining variation, which is only in the PA and antenna, can be dealt with using standard techniques. Understand while shown with these example gain change levels, embodiments are not limited in this regard.

Figure 10:
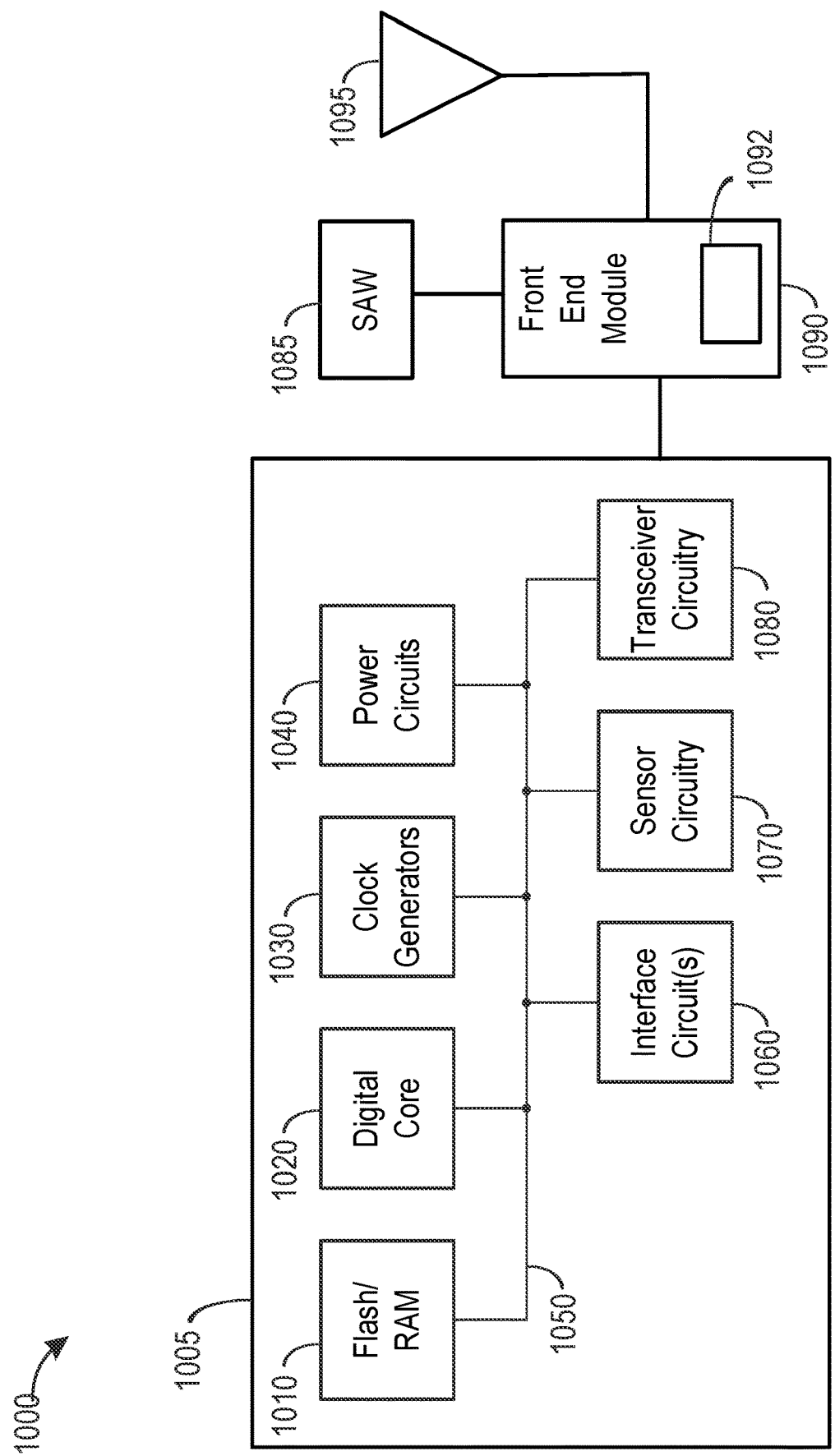
FIG. 10 is a block diagram of a representative IoT device that incorporates an embodiment.

Embodiments may be implemented in many different devices. Referring now to FIG. 10, shown is a block diagram of a representative IoT device 1000 in accordance with an embodiment. In the embodiment shown in FIG. 10, IoT device 1000 may be any connected device to provide a variety of different functionality. In the high level shown in FIG. 10, IoT device 1000 includes an integrated circuit 1005, e.g., a microcontroller, wireless transceiver that may operate according to one or more wireless protocols (e.g., WLAN-OFDM, WLAN-DSSS, Bluetooth, among others), or other device that can be used in a variety of use cases, including sensing, metering, monitoring, embedded applications, communications, applications and so forth, and which may be particularly adapted for use in an IoT device. In turn, integrated circuit 1005 couples to a front end module 1090 including switching circuitry 1092 and further to an off-chip filter 1085. In embodiments, switching circuitry 1092 may be controlled to enable operation in a given one of multiple available receive modes, either statically or dynamically, as described herein.

In the embodiment shown, integrated circuit 1005 includes a memory system 1010 which in an embodiment may include a non-volatile memory such as a flash memory and volatile storage, such as RAM. In an embodiment, this non-volatile memory may be implemented as a non-transitory storage medium that can store instructions and data. Such non-volatile memory may store instructions, including instructions for generating control signals for use in controlling switching of switching circuitry 1092 as described herein. In addition, this memory also may store instructions for dynamically controlling transmit power levels by updating levels of one or more components upstream of a PA. As described herein, such control may performed during a minimal initial portion of a preamble, to reduce impact on receiver acquisition.

Memory system 1010 couples via a bus 1050 to a digital core 1020, which may include one or more cores and/or microcontrollers that act as a main processing unit of the integrated circuit. In turn, digital core 1020 may couple to clock generators 1030 which may provide one or more phase locked loops or other clock generator circuitry to generate various clocks for use by circuitry of the IC.

As further illustrated, IC 1005 further includes power circuitry 1040, which may include one or more voltage regulators. Additional circuitry may optionally be present depending on particular implementation to provide various functionality and interaction with external devices. Such circuitry may include interface circuitry 1060 which may provide interface with various off-chip devices, sensor circuitry 1070 which may include various on-chip sensors including digital and analog sensors to sense desired signals, such as for a metering application or so forth.

In addition as shown in FIG. 10, transceiver circuitry 1080 may be provided to enable transmission and receipt of wireless signals, e.g., according to one or more of a local area or wide area wireless communication scheme, such as Zigbee, Bluetooth, IEEE 802.11, IEEE 802.15.4, cellular communication or so forth via connection to front end module 1090, in turn coupled to an antenna 1095. Understand while shown with this high level view, many variations and alternatives are possible.

Note that an IoT device leveraging an embodiment may be, as two examples, an IoT device of a home or industrial automation network or a smart utility meter for use in a smart utility network, e.g., a mesh network in which communication is according to an IEEE 802.15.4 specification or other such wireless protocol.

Figure 11:
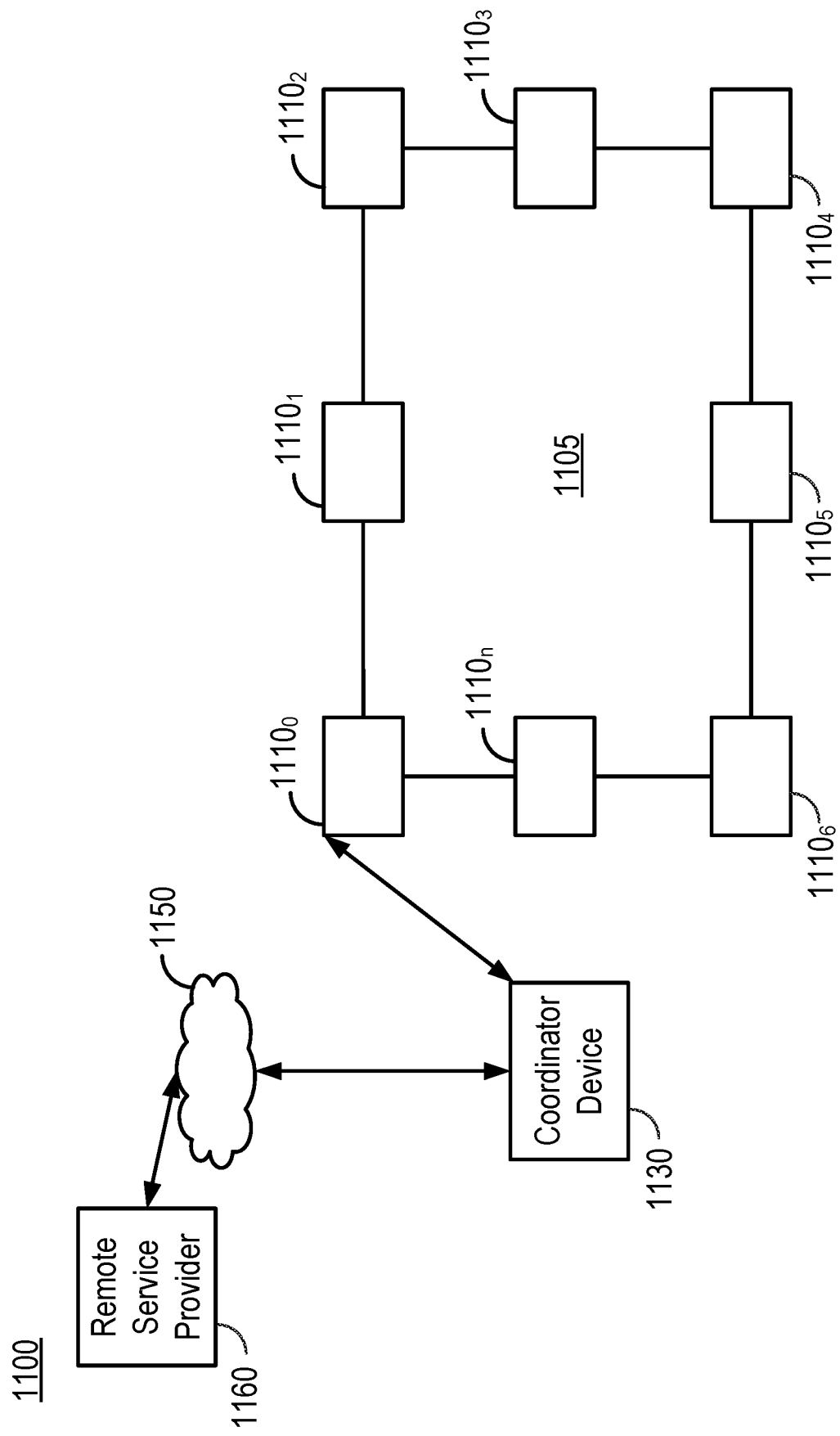
FIG. 11 is a high level diagram of a network in accordance with an embodiment.

Referring now to FIG. 11, shown is a high level diagram of a network in accordance with an embodiment. As shown in FIG. 11, a network 1100 includes a variety of devices, including smart devices such as IoT devices, coordinator devices and remote service providers. In the embodiment of FIG. 11, a mesh network 1105 may be present, e.g., in a neighborhood having multiple IoT devices $1110_{0-n}$ such as smart meters.

Such IoT devices may include switching circuitry as described herein, to enable controllable operation in a given one of available transmit and receive modes, and further may have gain control of their upstream transmit paths dynamically updated during initial preamble portions. As shown, at least one IoT device 1110 couples to a coordinator device 1130 that in turn communicates with a remote service provider 1160 via a wide area network 1150, e.g., the internet.

In an embodiment, remote service provider 1160 may include one or more backend servers that can be used in provisioning and managing communication with IoT devices 1110. Such backend server may include one or more processors, memories, storage, interface circuitry and so forth, to enable interaction within network 1100. Understand while shown at this high level in the embodiment of FIG. 11, many variations and alternatives are possible.

Embodiments may be used in other wireless protocols that may benefit from precise output power control, such as maximum power restrictions imposed by regulatory bodies such as FCC, ETSI, ARIB and the like. Another use case is related to the linearity of the PA. To prevent excess distortion a precise PA output power control may allow the PA to operate closer to its linearity limits, which helps to maximize a transmission range. Thus with embodiments, a higher RF output power can be realized while maintaining compliance over a wider range of operating conditions, and closer to the limits of regulations and device capability. In contrast, without an embodiment, control is often limited to operation at a lower power so when variations occur the device is still compliant.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. An apparatus comprising:
   a transmit path to receive, process and output a transmit radio frequency (RF) signal, the transmit path comprising a power amplifier to amplify and output the transmit RF signal; and
   a detection circuit coupled to the transmit path, the detection circuit to:
      detect, during a first portion of a packet of the transmit RF signal, a level of the transmit RF signal at an input to the power amplifier; and
      detect, during a second portion of the packet of the transmit RF signal the level of the transmit RF signal at an output of the power amplifier, wherein based at least in part on the level of the transmit RF signal at at least one of the input or the output of the power amplifier, a level of at least one component of the transmit path that is upstream to the power amplifier is to be updated, to control a transmit power variation of the transmit RF signal.

2. The apparatus of claim 1, wherein the detection circuit is to detect the level of the transmit RF signal at the input to the power amplifier during a first portion of a preamble of the packet of the transmit RF signal.

3. The apparatus of claim 1, wherein the apparatus comprises a front end module having the transmit path and the detection circuit.

4. The apparatus of claim 3, wherein the front end module is coupled to a system on chip (SoC) comprising a controller, wherein the SoC comprises the at least one component.

5. The apparatus of claim 4, wherein based at least in part on the level of the transmit RF signal, the controller is to cause the update of the level of the at least one component to occur during a first portion of a preamble of the packet of the transmit RF signal.

6. The apparatus of claim 5, wherein the controller is to prevent update during a second portion of the preamble following the first portion of the preamble.

7. The apparatus of claim 5, wherein the controller is to cause a plurality of updates to the level of the at least one component during the first portion of the preamble according to a funneled envelope.

8. The apparatus of claim 7, wherein the plurality of updates have a descendingly allowable update range.

9. A method comprising:
   receiving, during a preamble of a packet of a transmit radio frequency (RF) signal, in a controller coupled to a detector circuit of a radio frequency (RF) front end circuit comprising a power amplifier, a plurality of measurements each comprising a level of the transmit RF signal with respect to the power amplifier;
   for each of the plurality of measurements, determining an update to an upstream component coupled to the power amplifier based at least in part on the level of the transmit RF signal, and causing the update to the upstream component during a first portion of the preamble; and
   after determining the update and causing the update for each of the plurality of measurements, preventing a further update to the upstream component during a remainder of the preamble of the packet.

10. The method of claim 9, wherein causing the update to the upstream component comprises:
    updating the upstream component with a first gain change; and
    thereafter updating the upstream component with a second gain change less than the first gain change.

11. The method of claim 10, further comprising:
    limiting the first gain change to less than or equal to a first allowable gain change; and
    limiting the second gain change to less than or equal to a second allowable gain change less than the first allowable gain change.

12. The method of claim 9, further comprising:
    receiving, in the controller, a notification from a direct memory access (DMA) engine for each of the plurality of measurements; and
    accessing a memory in response to the notification to obtain a corresponding measurement of the plurality of measurements.

13. The method of claim 12, further comprising obtaining, via the DMA engine, each of the plurality of measurements in response to timeout of a timer and storing each of the plurality of measurements in the memory.

14. The method of claim 9, further comprising:
accessing calibration data of the power amplifier;
determining at least one of a voltage or a temperature of the RF front end circuit; and
controlling the power amplifier based at least in part on the calibration data and the at least one of the voltage or the temperature.

15. The method of claim 9, wherein causing the update comprises updating the upstream component a maximum number of times within a first symbol of the preamble and thereafter preventing the further update to the upstream component during the preamble, wherein the maximum number of times is less than five.

16. A wireless device comprising:
a first integrated circuit comprising a radio frequency (RF) front end module, the RF front end module comprising:
a transmit path to receive, process and output a transmit RF signal, the transmit path comprising a power amplifier; and
a detector circuit to detect a level of the transmit RF signal; and
a second integrated circuit coupled to the first integrated circuit, the second integrated circuit comprising:
a host processor;
baseband circuitry coupled to the host processor to process an output signal, the baseband circuitry comprising a pre-driver to adjust a level of the output signal;
upconversion circuitry to upconvert the output signal to the transmit RF signal;
an RF circuit coupled to the upconversion circuitry, the RF circuit to process and output the transmit RF signal to the first integrated circuit;
a memory coupled to the host processor; and
a controller coupled to the host processor and the memory, the controller comprising an engine, wherein in response to a plurality of timer expirations during a preamble of the transmit RF signal, the engine is to obtain measurement information regarding a level of the transmit RF signal, store the measurement information into the memory, and inform the controller regarding the storage of the measurement information into the memory;
wherein the controller is to update a level of at least one of the pre-driver or the RF circuit one or more times during the preamble of the transmit RF signal, based at least in part on the measurement information.

17. The wireless device of claim 16, wherein the first integrated circuit further comprises a non-volatile storage to store compensation data for the power amplifier.

18. The wireless device of claim 17, wherein the controller is to update a level of the power amplifier based at least in part on the compensation data.

19. The wireless device of claim 18, wherein the controller is to further update the level of the power amplifier based at least in part on at least one of a temperature or a voltage of the first integrated circuit.

20. The wireless device of claim 16, wherein the controller is to update the level of the at least one of the pre-driver or the RF circuit in proportion to a difference between the measurement information and a target value.

* * * * *

UNITED STATES PATENT AND TRADEMARK OFFICE
CERTIFICATE OF CORRECTION

PATENT NO. : 11,901,924 B2
APPLICATION NO. : 17/897706
DATED : February 13, 2024
INVENTOR(S) : Thomas Edward Voor, Hendricus De Ruijter and Richard Hendricks It is certified that error appears in the above-identified patent and that said Letters Patent is hereby corrected as shown below:

In the Claims

Column 15:
Line 67, Claim 1, "signal the" should be --signal, the--.

Signed and Sealed this
Fifth Day of March, 2024

Katherine Kelly Vidal
*Director of the United States Patent and Trademark Office*